United States Patent [19]

Rothlauf

[11] 4,325,147

[45] Apr. 13, 1982

[54] ASYNCHRONOUS MULTIPLEX SYSTEM

[75] Inventor: Alan P. Rothlauf, Ypsilanti, Mich.

[73] Assignee: Minnesota Mining & Manufacturing Co., St. Paul, Minn.

[21] Appl. No.: 159,571

[22] Filed: Jun. 16, 1980

[51] Int. Cl.³ .............................. H04J 3/00; H04J 4/00
[52] U.S. Cl. ...................................................... 370/91
[58] Field of Search ......................... 370/24, 91, 92, 93

[56] References Cited

U.S. PATENT DOCUMENTS

| | | |
|---|---|---|
| 3,145,374 | 8/1964 | Benner et al. |
| 3,564,147 | 2/1971 | Puehte et al. |
| 3,641,434 | 2/1972 | Yates et al. |
| 3,647,949 | 3/1972 | Closs et al. |
| 3,796,835 | 3/1974 | Closs et al. |
| 3,873,774 | 3/1975 | Cabet et al. |
| 4,061,879 | 12/1977 | Wintzer |
| 4,097,695 | 6/1978 | Grace et al. |
| 4,119,795 | 10/1978 | Hoelzl et al. |
| 4,130,885 | 12/1978 | Dennis |
| 4,229,815 | 10/1980 | Cummiskey ........................... 370/84 |

FOREIGN PATENT DOCUMENTS 519874 8/1976 U.S.S.R. ................................. 370/91

OTHER PUBLICATIONS

IBM Technical Note, vol. 11, No. 8, Jan. 1969, pp. 910-991.

Primary Examiner—Robert L. Richardson
Attorney, Agent, or Firm—Krass, Young & Schivley

[57] ABSTRACT

An asynchronous multiplex system allows full duplex communication between a plurality of terminals each provided with a universal, asynchronous receiver-transmitter (UART) which serially receives data information from a source thereof and is operative to produce a flag signal indicating that all of the bits of a data word have been received for storage therein and are ready for transmission. The multiplex system includes a transmitter section and receiver section servicing a group of data terminals. The transmission section includes a scanner which sequentially interrogates the UARTS associated with each of the corresponding data terminals, and control logic for causing the data words stored in a UART to be delivered to a transmission shift register for temporary storage. The transmitter section further includes an encoder which develops a data code identifying the particular terminal from which the data word is being transmitted. The control logic causes the data word and corresponding code to be simultaneously transmitted as a single, multi-bit data message over a transmission path to the receiving section of another multiplexer servicing another group of terminals. The control logic functions to suspend and scanning process until the transmission shift register is emptied by transmission of the previous data message. The receiving section of each multiplexer includes a pair of shift registers for respectively receiving and storing the data word and data code portions of a data message originating from a terminal in another group thereof, and is provided with control logic for delivering the data word to a terminal identified by the data code.

11 Claims, 5 Drawing Figures

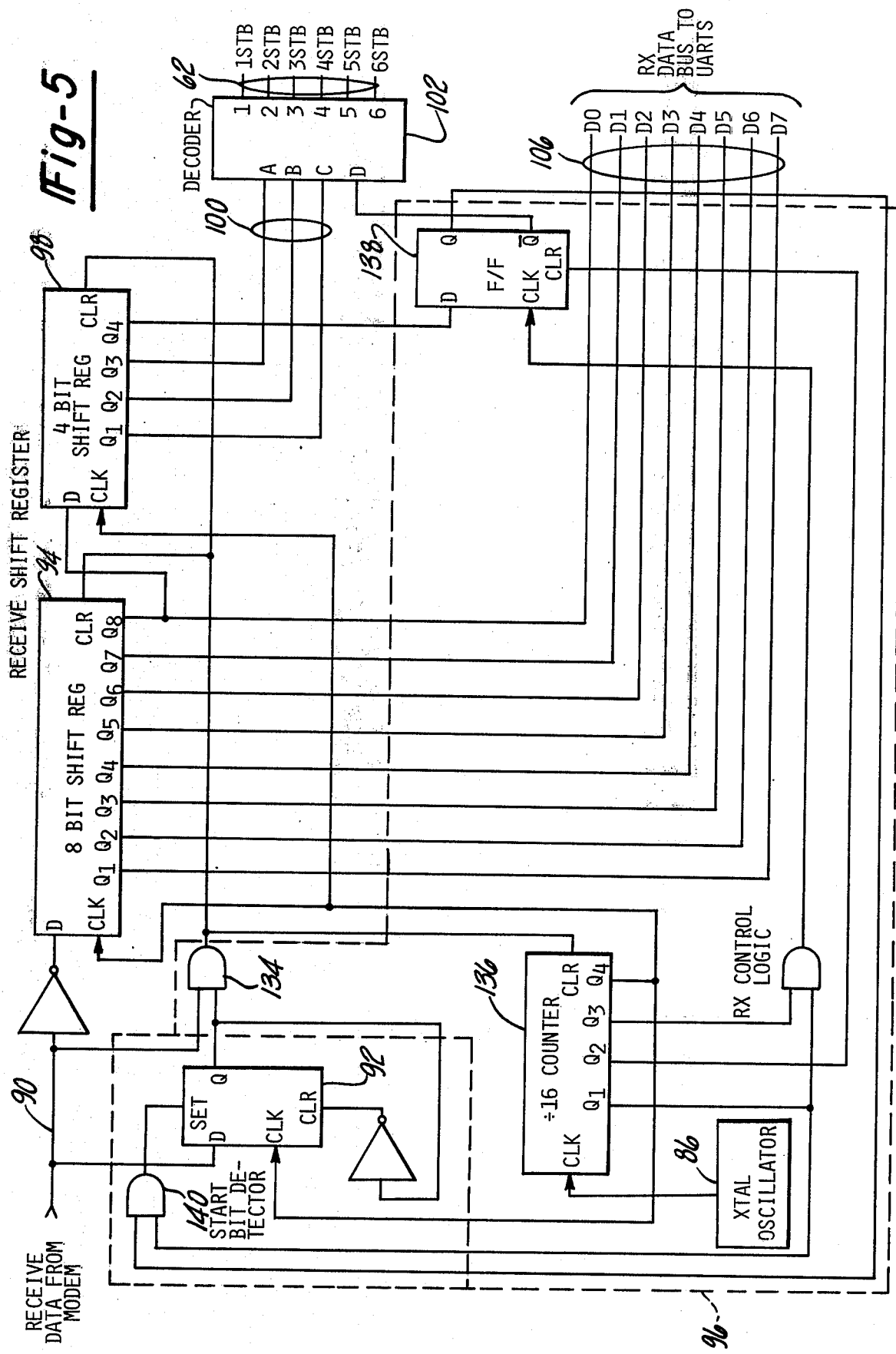

ASYNCHRONOUS MULTIPLEX SYSTEM

TECHNICAL FIELD

The present invention generally relates to multiplex systems, and deals more particularly with a system of the asynchronous type in which any of a group of data terminals may communicate with either a master station, or any of another group of terminals over a single communication path.

BACKGROUND ART

Multiplex systems of both the time division and frequency division types are well known in the art in connection with full duplex communication systems. Asynchronous multiplex systems, such as that disclosed in U.S. Pat. No. 4,097,695, are also known in which the bits within each character or block of characters relates to a fixed time frame, but wherein the start of each character or block thereof is not necessarily related to such fixed time frame.

Typically, asynchronous multiplex systems avoid the need for transmitting high frequency clock signals between terminals be employing integrated circuits know as universal, asynchronous receiver transmitters (UART's). These UART circuit subsystems have simultaneous receiving and transmitting capabilities, and provide for converting data words serially received into parallel format, and for serially transmitting data words input to the UART in parallel format. Although timing clocks are necessary, the clocks employed by each UART in a pair of data terminals between which information is communicated need not be synchronous; thus, independent clock generators can be used and no clock transmission is required.

In connection with prior art, asynchronous multiplex systems, it was often necessary to include a plurality of address bits as part of the data message output from a UART of a terminal transmitting data in order to access the proper terminal at the other end of a data link which is to receive such message.

Accordingly, it is a primary object of the present invention to provide a multiplex system of the asynchronous type in which any of a group of data terminals may efficiently communicate with a master station or a data terminal in another group thereof.

Another object of the present invention is to provide a multiplex system of the type described above in which data is transmitted from any of a group of data terminals in accordance with the sequence of the formation of data words at such terminals.

A still further object of the present invention is to provide a system of the type mentioned above which employs a plurality of universal, asynchronous receiver-transmitters respectively associated with each data terminal in a group thereof for serially receiving and temporarily storing data bits from the corresponding data terminal.

A further object of the present invention is to provide a multiplex system as described above which includes a scanner for successively scanning the UART's to detect the presence of a data word stored therein which is ready for transmission, such that data words are transmitted in an asynchronous manner determined by the sequence in which such data words are formed.

DISCLOSURE OF THE INVENTION

In accordance with the present invention, an asynchronous multiplex system allows full duplex communication between any of a group of data terminals and a master station or another group of data terminals. Each terminal includes a universal, asynchronous receiver transmitter which serially receives data information from a source thereof and is operative to produce a flag signal indicating that all of the bits in a data word have been received in storage and are ready for transmission. A transmitter section of the multiplexer system includes a scanner which sequentially scans each of the UARTs associated with one group of data terminals and is provided with control logic for suspending the scanning process when a flag signal has been detected. The control logic then causes the data word to be delivered from the UART producing the flag signal to a shift register for temporary storage therein. The scanning process is suspended while a multi-bit data code is generated which identifies the UART transmitting the data word. The data code is delivered to the shift register and is combined with a data word to form a message which is then transmitted on a communication line, whereupon the scanner resumes the scanning process. The system also includes a receiving section servicing another group of data terminals, which includes a pair of shift registers for respectively receiving and storing the data word and data code portions of the message therein. Control logic is provided for delivering the data word to a terminal serviced by the receiving section which is identified by the data code.

BRIEF DESCRIPTION OF THE DRAWINGS

In the drawings, which form an integral part of the specification and are to be read in conjunction therewith, and in which like components are designated by identical reference numerals in the various views.

BEST MODE FOR CARRYING OUT THE INVENTION

Figure 1:
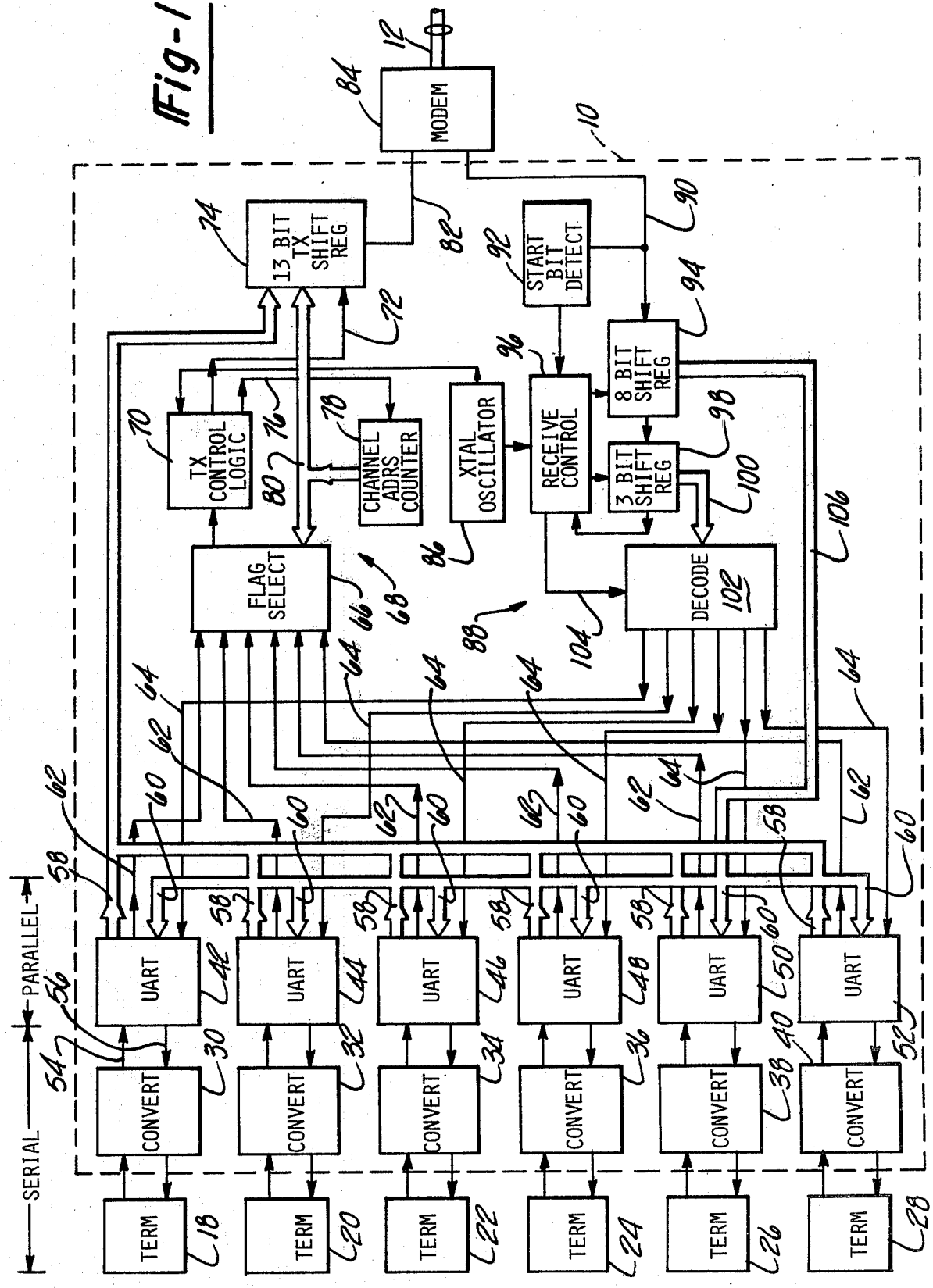
FIG. 1 is a block diagram of the transmit and receive sections of an asynchronous multiplexer servicing one group of data terminals, which forms the preferred embodiment of the present invention.
Figure 2:
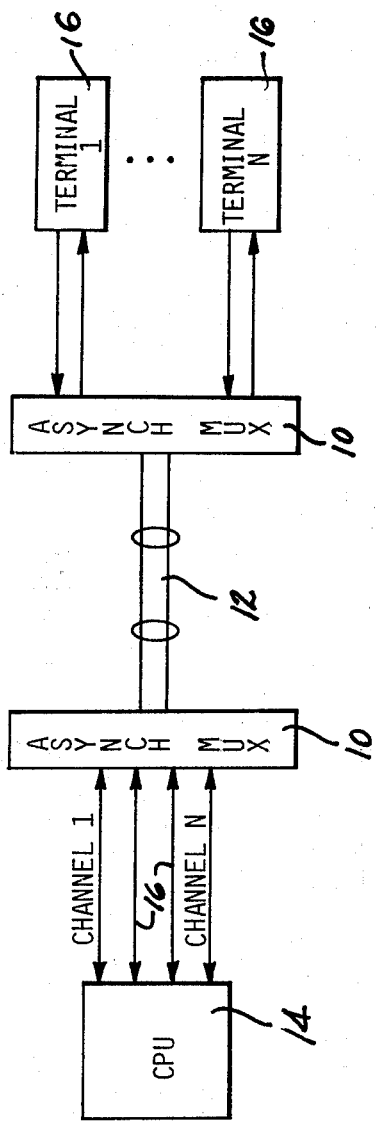
FIG. 2 is a block diagram depicting the use of the asynchronous multiplex system shown in FIG. 1 for use in communicatively interfacing a group of data terminals with a computer.
Figure 3:
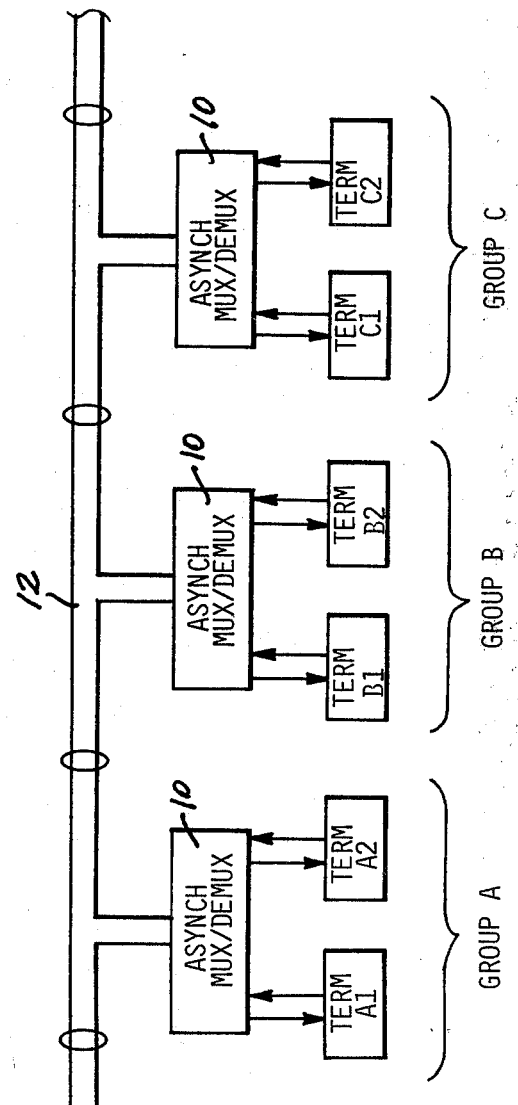
FIG. 3 is a block diagram showing the asynchronous multiplex system of the present invention used for communicatively interfacing a plurality of groups of data terminals over a single communication line.

Referring first to FIGS. 1 through 3, the present invention is concerned with an asynchronous multiplex system 10 for communicatively interfacing data sources and data recipients over a single communication path, such as a coaxial cable 12.

As shown in FIG. 2, the multiplex system 10 may be employed to communicatively interface a master station, such as a computer 14 operating on a plurality of channels 16 over a communication line 12 with a plurality of remote terminals 16, each of the terminals 16 having full duplex communication capability. In this application, a first multiplex system 10 is employed to interface the communication line 12 with the computer 14 while a second multiplex system 10 is employed to interface the communication line 12 with each of the plurality of remote terminals 16.

In another application, the multiplex system 10 of the present invention may be employed to permit communication between any of a first group of data terminals with any of a second group thereof. For example, as shown in FIG. 3, a multiplexer system 10 communicatively interfaces the common communication line 12 with each terminal in three groups thereof respectively designated as groups "A", "B" and "C". Thus, terminal A1 of group A may communicate with terminal B1 in group B or, terminal A2 is group A may communicate with terminal C2 in group C and, etc.

As shown in FIG. 3, the multiplex system of the present invention generally indicated within the broken line 10, communicatively interfaces a plurality of data terminals 18–28 with a communication line, such as the coaxial cable 12. Each of the data terminals 18–28 may comprise any source of digitalized data such as keyboard devices and the like. Each of the data terminals 18–28 delivers digitalized data in serial format to corresponding convertors 30–40 which function to convert the signal level of such data to achieve compatability with the remaining components of the multiplexer 10 discussed below. Convertors 30–40 also function to convert the level of information signals processed by the multiplexer 10 and deliver such converted signals to the associated data terminal 18–28. Each of the convertors 30–40 sends, or may receive, data information to an associated UART (universal, asynchronous receiver transmitter), designated by the corresponding numerals 42–52. Each of the UARTs 42–52 is a commercially available item whose construction and operation is well known to those skilled in the art and therefore need not be discussed in detail herein. The UARTs 42–52 are each provided with a serial data input and serial data output, as at 54 and 56 respectively, which are each coupled with the corresponding convertors 30–40. Each of the UARTs 42–52 further includes a parallel data output 58, a parallel data input 60 and a shift register (not shown) for temporarily storing data information being delivered from serial data input 54 to parallel data output 58 and from parallel data input 60 to serial data output 56. Such shift register includes an output line 62 on which there is delivered a flag signal when the last bit of a data word has been serially received into storage from the corresponding data terminal 18–28. The shift register associated with each UART 42–52 also includes a control input line 64 for causing a data word stored therein to be output in serial form to the corresponding data terminal 18–28.

Thus, each of the UARTs 42–52 provides for simultaneous reception and transmission of digital data and provides serial to parallel and parallel to serial conversion so that data accepted in conventional parallel data bit format is translated into serial format. Likewise, data received in the receiver portion of the UART in serial format is output in parallel form. Additionally, the UARTs may communicate with one another without the necessity for sending clock pulses back and forth over the communication line 12.

Data may be delivered from any of the data terminals 18–28 to the corresponding UARTs 42–52 in an asynchronous manner. When a data word of a predetermined number of bits has been received and stored into the shift register of one of the UARTs, a flag signal is output on line 62 and is delivered to a flag select circuit which forms one component of a transmission section of the multiplexer, generally indicated by the numeral 68. The flag select circuit 66 continuously samples or polls each of the output lines 62 and delivers a signal to transmission control logic 70 when a flag signal on one of the lines 62 has been detected. At this point, the flag select circuit temporarily terminates the polling process. Control logic 70 then sends an enabling signal on line 72 to a transmit shift register 74 thereby enabling the latter to receive data into storage therein. Control logic 70 also delivers a signal on line 76 to the channel address counter 78 which generates a multi-bit, coded data character or word uniquely identifying the data terminal 18–28 whose corresponding UART 42–52 has produced a flag signal on its output line 62. The data word is then output from the UART 42–52 whose flag signal has been detected and is delivered for storage into the shift register 74 by data bus 58, while the multi-bit coded data word produced by counter 78 is also delivered for storage in shift register 74 on data bus line 80, such that the data word and its corresponding code are stored as a single, multi-bit data message in shift register 74. Such data message will include a start and stop bit derived from the UART 42–52 which is transmitting the data word. The data message stored in shift register 74 is delivered in serial format on line 82 to a modem 84 for transmission on communication line 12. Timing for the control logic 70, and other components of the transmission section 68 is provided by an oscillator circuit 86.

Each of the multiplex systems 10 further includes a receiving section generally indicated by the numeral 88 which is adapted to receive data messages from a data terminal in another group thereof serviced by a second multiplex system 10. Data messages received on communication line 12 are demodulated by modem 84 and are delivered via line 90 to a start bit detector 92 and a multi-bit shift register 94. Bit detector 92 detects the presence of the start bit of the data message and is responsive to the detection of the start bit to activate a receiver control circuit 96. The data word portion of the data message is received into storage by the shift register 94 while the multi-bit data code word identifying the data terminal from which the data word originated is received into storage in shift register 98. Shift register 94 and 98 are enabled by receiver control circuit 96 whose timing, in turn, is controlled by oscillator circuit 86. Once each of the bits of the coded data word are received into storage in the shift register 98, receiver control circuit 96 causes the coded data word to be delivered via the data bus 100 to a decode circuit 102 which is enabled by receiver control circuit 96 on an enabling line 104. Decoder circuit 102 has a plurality of enabling outputs which are respectively connected to control lines 64. Decoder circuit 102 is operative to decode the coded data word and produces an enabling signal on one of the lines 64 in accordance with the identity of the data word. Simultaneously, the data word stored in shift register 94 is output on data bus 106 and is delivered to the UART 42–52 whose control input line 64 has been enabled by decoder circuit 102. The UART 42–52 receiving such data word converts the latter to serial format and delivers the same to the associated convertor 30–40, and the resulting converted data word is delivered to the corresponding data terminal 18–28.

Figure 4:
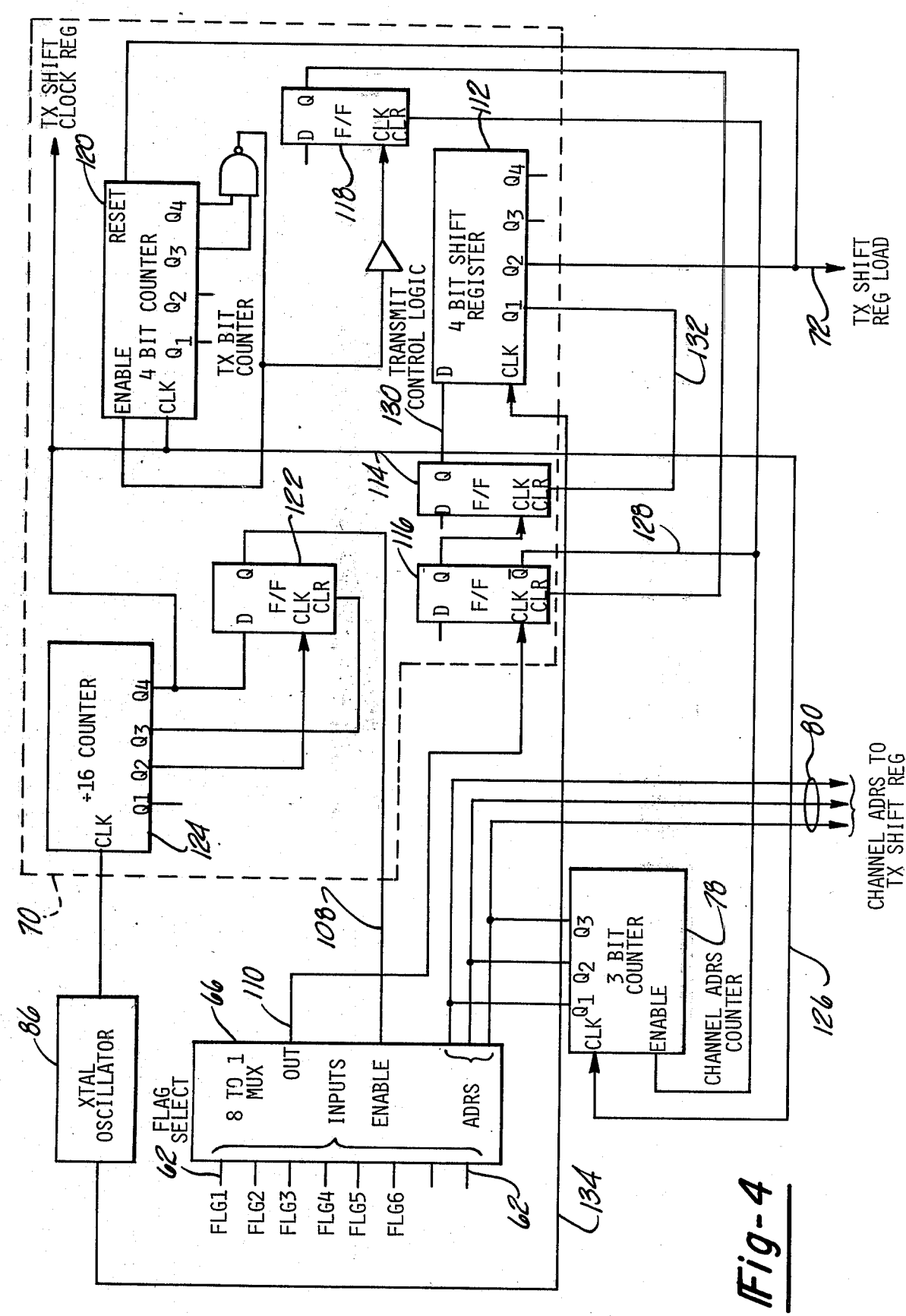
FIG. 4 is a combined schematic and block diagram of portions of the transmit section of the multiplex system shown in FIG. 1; and, FIG. 5 is a combined schematic and block diagram of the receive section of the multiplex system shown in FIG. 1.

Attention is also now directed to FIG. 4 wherein components of the transmitter section 68 of the multiplexer system 10 are shown in more detail. The flag select circuitry or scanner 66 comprises an eight to one multiplexer having a plurality of inputs 62, three address lines which comprise the data bus 80, an enabling input 108 and a control output 110. Control logic 70 broadly comprises a four bit shift register 112, a pulse generating flip-flop 114, a "busy" flip-flop 116, a transmit cycle flip-flop 118, and a four bit counter 120, a D-type flip-flop 122, and a divide-by-sixteen counter 124. Counter 124 is continually clocked by oscillator circuit 86 at a rate sixteen times the rate at which data is transmitted. The D-type flip-flop 122 is selectively activated by combinations of high signals on the $Q_2$ output of counter 124. The Q output of flip-flop 122 on line 108 enables the flag select circuit 166 such that lines 62 are sequentially sampled to detect the presence of the flag signal. The address counter 78 receives clock signals on line 126 from counter 124 such that the count of counter 78 is incremented by successive clock pulses, and of counter 78 corresponds in identity to the particular line 62 being polled upon any given clock pulse. Thus, counter 78 is incremented in synchronization with the polling of lines 62 by flag select circuitry 66. When a flag signal is detected on one of the lines 62 by flag select circuitry 66, an output pulse is delivered on line 110 to the clock input of busy flip-flop 116 which in turn delivers an output signal on line 128 to the enable input of counter 78 and the clear input of flip-flop 118. This last mentioned signal disables counter 78 such that the count thereof corresponds in its identity to the particular line 62 on which the flag signal has been detected. At this point the flag select circuitry suspends the polling sequence until the transmission of a data message has been completed. Counter 78 then delivers a three bit data code onto data bus 80 which is simultaneously delivered to the address inputs of flag select circuitry 66 and the data input of shift register 74. Also, upon clocking of busy flip-flop 116, the pulse generating flip-flop 144 is clocked, which in turn produces an output pulse on line 130 to the D input of the four bit shift register 112. The pulse on line 130 is then shifted to the first cell of shift register 112 which in turn causes a pulse to be delivered via line 132 to the clearing input of flip-flop 114, thereby resetting the latter. As shift register 112 is successively clocked by oscillator circuit 86 via line 134, an output pulse is delivered via line 72 to the load enabling input of shift register 74 as well as to the reset input of counter 120. Counter 120 simply functions as a timing device to suspend operation of the flag select circuitry 66 for twelve counts which, in the preferred embodiment, is sufficient to allow transmission of the data message. Flip-flop 118 is controlled by counter 120 and functions to reset busy flip-flop 116 (likewise resetting flag select circuitry 66 to its continuous polling mode) upon the transmission of a data message.

Referring also now to FIG. 5, which shows the various components of the receiver section in more detail, data is received in serial format on line 90 from the modem 84 and the start bit of the data message is detected by the start bit detector 92 which comprises a D-type flip-flop. When detector 92 senses the start bit on its D input, the Q output thereof changes state, thereby changing the state of the output of an AND gate 134. The change in state of the output of AND gate 134 deactivates the clearing inputs of shift registers 94 and 98, and also enables a divide-by-sixteen counter 136.

Upon enablement, counter 136 commences to continuously count in accordance with the timing of clock pulses derived from oscillator 86. The $Q_4$ output from counter 136 is delivered to the clock input of start bit detector 92, thereby latching in the operation of such detector, and is also delivered to the clock input of shift registers 94 and 98, thereby allowing data present on line 90 to be received into storage in such shift registers. Data continues to be clocked through the shift register 94 every time the $Q_4$ output of counter 136 goes high until the $Q_4$ output of shift register 98 goes high; at this point, a high signal is delivered from the $Q_4$ output of shift register 98 to the D input of flip-flop 138 whereupon the $\bar{Q}$ output goes low. A low going signal on the $\bar{Q}$ output of flip-flop 138 enables the decoder 102, and the three bit data code present on lines 100 derived from shift register 98 is decoded to identify the data terminal 18-28 to which the data word is to be delivered. The change in state of the Q output of flip-flop 138 is delivered via AND gate 140 to the start bit detector 140, thus resetting and unlatching the detector which is thereby prepared for detecting the next start bit associated with the next to be received data message. The decoder 102 produces an enabling signal one one of the output lines 62 thereby enabling the UART 42-52 associated with the terminal 18-28 which is to receive the data word and all eight bits of such data word are delivered on the parallel data bus 106 to the UART 42-52 so enabled.

From the foregoing, it may be appreciated that the asynchronous multiplex system described above not only provides for the reliable accomplishment of the objects of the invention, but does so in a particularly simple and effective manner. It is recognized, however, that those skilled in the art may make various modifications or additions to the preferred embodiment chosen to illustrate the invention without departing from the spirit and scope of the present contribution to the art. Accordingly, it is to be understood, that the protection sought and to be afforded hereby should be deemed to extend to the subject matter claimed and all equivalents thereof fairly within the scope of the invention.

What is claimed is:

1. An asynchronous multiplex system, comprising:
a plurality of first data storage means each adapted to receive a data word into storage therein from a corresponding data source;
means coupled with each of said plurality of data storage means for detecting the presence of a data word in any of said data storage means;
means for generating a multi-bit data code identifiable with that first data storage means in which the presence of a data word has been detected by said detecting means;
second data storage means connected with said generating means and with each of said first data storage means, and adapted to be coupled with a multichannel communication line for storing said data word and data code as single data message therein; and
control means coupled with said detecting means, each of said first data storage means, said generating means and said second data storage means, for causing said data word and said data code to be delivered into storage in said second data storage means, and for causing said data message to be delivered from said second data storage means to said communication line for transmission thereon.

2. The system of claim 1, wherein each of said first data storage means is provided with a serial data input connected to the corresponding data source, and a parallel data output, and further includes means for producing a flag signal when all the bits of a data word have been received into storage therein.

3. The system of claim 1, wherein said detecting means comprises a multiplexer and said data code generating means comprises a multi-bit counter having a data output coupled with said multiplexer and with said second data storage means.

4. The system of claim 3, wherein said second data storage means comprises first shift register means, and said control means comprises second shift register means.

5. The system of claim 1, including:
a plurality of third data storage means each having a data input, a data output and being respectively associated with said plurality of first data storage means and with a plurality of data recipients, and each operative for receiving said data word for storage therein and for delivering a data word stored therein to a corresponding data recipient;
a fourth data storage means having a data input operably coupled with said communications line for receiving said data message into storage therein; and
means for controlling the delivery of the data word portion of the data message stored in said fourth data storage means to one of said plurality of third data storage means, and including means for decoding the data code portion of said data message to determine the identity of the particular one of said plurality of third data storage means to which the data word is to be delivered.

6. The system of claim 5, wherein said controlling means includes gate means and a bi-stable circuit element.

7. A multiplex system for use in transmitting data messages from any of a plurality of data sources over a single transmission path to a plurality of data recipients each respectively associated with one of said data sources, said data sources and said respectively associated data recipients forming a plurality of data pairs, comprising:
a first plurality of data storage means respectively associated with each of said data sources for serially receiving a group of data bits defining a message from an associated data source and for temporarily storing said group of data bits therein, each of said first plurality of data storage means including
(1) a parallel data output,
(2) a control input for causing data stored therein to be unloaded onto said data output thereof,
(3) means for producing a flag signal indicating that all of the bits in a group thereof have been received into storage therein, and
(4) a serial data input coupled with a corresponding data source; and
means for controlling the transmission of messages from each of said first plurality of data storage means, including
(1) means operatively connected to each of said flag signal producing means for scanning each of the latter to detect the presence of a flag signal at one of the last mentioned data storage means,
(2) a control circuit operatively coupled with said scanning means,
(3) code generation means for providing a plurality of data codes each uniquely identifying one of said communications channels and comprising a plurality of data bits, said code generation means having a data output onto which said plurality of data bits may be delivered, and a control input operatively coupled with said control circuit for controlling the delivery of data codes to said data output thereof,
(4) shift register means having a parallel data output coupled with said transmission path for temporarily storing said group of data bits comprising said message and said plurality of data bits of a data code identifying the data pair between which said last named message is being communicated, said parallel data input being operatively coupled with said data output of each of said first plurality of said data storage means and with said data output of said code generation means, said shift register means further including a control input coupled with said control circuit for causing data stored therein to shift to said data output in serial form,
said control circuit being operable for causing the data bit group stored in one of said first plurality of data storage means to be loaded into storage in said shift register means when said scanning means detects the presence of a flag signal at said one data storage means, and for causing said code generation means to produce a data code corresponding to the data pair between which said last named message is being communicated and for causing said data code to be delivered for storage into said shift register means to form a coded data word stored in said shift register means,
said control circuit being further operative to cause said shift register means to output said coded data word in serial form for transmission over said transmission path to the data recipient of the last named data pair.

8. The multiplex system of claim 7, further including means for controlling the delivery of said messages to said plurality of data recipients, said delivery controlling means comprising:
a second plurality of data storage means respectively associated with said data recipients, each operative for receiving said group of data bits defining a message in parallel form and for temporarily storing said group of data bits therein, each of said second plurality of data storage means including
(1) a parallel data input,
(2) an enabling input for causing data bits received on said data input to be stored therein,
(3) a serial data output operably coupled with a corresponding data recipient.
shift register means having a serial input coupled with said transmission path for receiving said coded data word for temporary storage therein and having a first parallel data output operably coupled with the parallel data input of each of said second plurality of data storage means for delivering said group of data bits corresponding to said message to each of said last named data storage means,
decoding means operably coupled with said last named shift register means for decoding said coded data word to determine the identity of the data pair associated with said data word, said decoding means including a plurality of enabling outputs respectively coupled with the enabling inputs of said second plurality of data storage means, said decoding means being operable to enable the data storage means in said second plurality thereof corresponding to said last named data pair for receiving said group of data bits for storage therein from said last named shift register means.

9. The multiplex system of claim 8, wherein said shift register means associated with said delivery controlling means includes:

a first shift register for temporarily storing therein said group of data bits corresponding to said message, said first shift register having coupled therewith said serial input associated with said transmission path and said first parallel data output said first shift register further including a serial data output, and a second shift register having a serial input for receiving said data code and for temporarily storing said data code therein, said second shift register including a parallel data output operably coupled with said decoding means for delivering said data code thereto.

10. The multiplex system of claim 9, further including receiver control means having a plurality of control outputs respectively operably coupled with said decoding means, said first shift register and said second shift register for controlling each of the latter's operation.

11. A method of communicating data messages from any of a plurality of data sources over a single transmission path to one of a plurality of data recipients, each of said data sources being associated with a corresponding one of said data recipients to define a plurality of data pairs, comprising the steps of:

(A) delivering said messages from said data sources in the form of a group of data bits to a first plurality of respectively associated storage locations;

(B) producing a flag signal at each of said first plurality of storage locations when all of the data bits in a group thereof have been received into storage from the corresponding data source;

(C) scanning each of said first plurality of storage locations to detect the presence of a flag signal thereat;

(D) generating a data code comprising a plurality of data bits when a ready signal at one of said first plurality storage locations has been detected, said data code uniquely identifying the data pair defined by the data source corresponding to said one storage location;

(E) combining said group of data bits in said on storage location with said plurality of data bits of said data code to form a data word;

(F) transmitting said data word over said transmission path;

(G) receiving said data word transmitted over said data path;

(H) separating said group of data bits forming said message from said plurality of data bits forming said data code;

(I) decoding said data code to determine the identity of the data pair associated with the message received in step (H);

(J) delivering said group of data bits forming said message to each of a second plurality of storage locations each respectively associated with one of said data recipients;

(K) entering said group of data bits delivered in step (J) into storage at the storage location in said second plurality thereof corresponding to the data pair identified in step (I); and (L) delivering said group of data bits stored in step (K) to the data recipient associated with the data pair identified in step (I).

* * * * *